United States Patent
Onishi

(10) Patent No.: US 10,893,168 B2
(45) Date of Patent: Jan. 12, 2021

(54) MULTI-FUNCTION APPARATUS AND METHOD FOR AUTHENTICATING RECEIVED FACSIMILE DATA AND OUTPUTTING THE RECEIVED FACSIMILE

(71) Applicant: Sharp Kabushiki Kaisha, Sakai (JP)

(72) Inventor: Takahisa Onishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/897,231

(22) Filed: Feb. 15, 2018

(65) Prior Publication Data

US 2018/0241910 A1    Aug. 23, 2018

(30) Foreign Application Priority Data

Feb. 20, 2017 (JP) ................. 2017-029224

(51) Int. Cl.
*H04N 1/44* (2006.01)
*H04N 1/00* (2006.01)
*H04N 1/32* (2006.01)

(52) U.S. Cl.
CPC ....... *H04N 1/4426* (2013.01); *H04N 1/00408* (2013.01); *H04N 1/32106* (2013.01); *H04N 1/32117* (2013.01); *H04N 2201/3202* (2013.01); *H04N 2201/3273* (2013.01); *H04N 2201/3276* (2013.01)

(58) Field of Classification Search
CPC ............ H04N 1/4426; H04N 1/32106; H04N 1/32096; H04N 1/32069
USPC ............ 358/1.14, 1.15, 1.16; 709/207, 232; 726/4, 28
See application file for complete search history.

(56) References Cited

U.S. PATENT DOCUMENTS

| | | | | |
|---|---|---|---|---|
| 5,668,642 A | * | 9/1997 | Yoshida | H04N 1/00893 358/400 |
| 2007/0011410 A1 | * | 1/2007 | Fukui | G06F 21/608 711/154 |
| 2008/0209055 A1 | * | 8/2008 | Kazama | H04L 63/08 709/229 |
| 2012/0257734 A1 | * | 10/2012 | Sun | H04N 1/00217 379/100.09 |
| 2013/0177145 A1 | * | 7/2013 | Watts | H04N 1/00214 379/100.17 |
| 2015/0055187 A1 | * | 2/2015 | Nagano | H04N 1/32 358/401 |

FOREIGN PATENT DOCUMENTS

| JP | 11-289446 A | 10/1999 |
|---|---|---|
| JP | 2010-000703 A | 1/2010 |

* cited by examiner

*Primary Examiner* — Jamares Q Washington
(74) *Attorney, Agent, or Firm* — Keating & Bennett, LLP

(57) ABSTRACT

An image information providing apparatus provides received image information to a registered user if a sender of the received image information matches a communication destination included in a list of communication destinations corresponding to the registered user.

16 Claims, 7 Drawing Sheets

FIG. 4

| NAME | ADDRESS |
|---|---|
| ABC COMPANY | 012-345-6789 |
| MR. ABC | 098-765-4321 |

FIG. 5

| DATE | FACSIMILE NO. | FACSIMILE DATA |
|---|---|---|
| 2016. 8. 20  18:00 | 012-345-6789 | Image 1 |
| 2016. 8. 21  9:30 | 056-789-1234 | Image 2 |
| 2016. 8. 22  12:45 | 098-765-4321 | Image 3 |

FIG. 6

| CHECK | DATE | NAME |
|---|---|---|
| ☑ | 2016. 8. 20 18:00 | ABC COMPANY |
| ☑ | 2016. 8. 22 12:45 | MR. ABC |

LIST OF FACSIMILE RECEPTION DATA

PRINT   END

MULTI-FUNCTION APPARATUS AND METHOD FOR AUTHENTICATING RECEIVED FACSIMILE DATA AND OUTPUTTING THE RECEIVED FACSIMILE

BACKGROUND

1. Field

The present disclosure relates to an image information providing apparatus, a multi-function apparatus, an image information providing method, and a program.

2. Description of the Related Art

FIG. 8 illustrates how facsimile transmission is performed from a facsimile machine 900 serving as a sender to a multi-function apparatus 1000 serving as a transmission destination. The transmission data from the facsimile machine 900 is received by the multi-function apparatus 1000, and the multi-function apparatus 1000 prints the transmission data as an image, and discharges the printed image.

FIG. 9 illustrates the multi-function apparatus 1000. The multi-function apparatus 1000 is an image copying apparatus including an image forming apparatus and an image reading apparatus, and additionally has functionalities for network connection, facsimile operation, data communication, data input and output operation, and data storage.

Referring to FIG. 9, the multi-function apparatus 1000 includes an operation panel 1100, a modular jack 1200 that connects to a facsimile network, an integrated circuit (IC) card reader 1300 for user authentication, and a paper discharge tray 1400 that receives discharged printed paper sheets. The device that performs user authentication is not limited to the IC card reader 1300. The device that performs user authentication may be a device that uniquely identifies a user. For example, such a device may perform user authentication in accordance with a user identification (ID) and password using an operation panel 1100, or may be a fingerprint reader.

One type of the multi-function apparatus 1000 may be set to be usable through an authentication process.

Japanese Unexamined Patent Application Publication No. 2010-703 (published Jan. 7, 2010) discloses a technique of printing print commands. When authentication identification data in a print command received from a facsimile machine or personal computer is to be authenticated, a user who has issued the print command is authenticated. Past print commands remaining unauthenticated are then printed in sequence.

Japanese Unexamined Patent Application Publication No. 11-289446 (published Oct. 19, 1999) discloses a technique of transferring reception information. When a sender A transmits a facsimile message, the reception information is transferred to a destination B that is associated with the sender A by referencing a transfer table.

Facsimile machines receive and print information from within or from outside a company, for example. A receiver side visually checks the address of a printed document and then receives the printed document. If the printed document is left untouched, a third party may see it and this is not desirable from the security point of view.

The technique disclosed in Japanese Unexamined Patent Application Publication No. 2010-703 is based on the premise that the sender and the transmission destination are of the same type or use the same format, and is thus unable to respond to information from a variety of types of apparatuses from within or outside the company. Even if the sender and the transmission destination are of the same type or use the same format, the user at the sender specifies and authenticates the address of the transmission destination at each transmission. This inconveniences the user. The user may make an error in these configurations, or may forget to configure something in the configurations. This is not desirable from the security standpoint of view.

In the technique disclosed in Japanese Unexamined Patent Application Publication No. 11-289446, facsimile information is transmitted to a predetermined transfer destination. A third party may possibly see a document printed on a facsimile receiver at the transfer destination. This is not desirable from the security standpoint point of view.

SUMMARY

It is desirable to provide an image information providing apparatus, a multi-function apparatus, an image information providing method, and a program for outputting received image information in view of security.

According to an aspect of the disclosure, there is provided an image information providing apparatus. The image information providing apparatus provides received image information to a registered user if a sender of the received image information matches a communication destination included in a list of communication destinations corresponding to the registered user.

According to another aspect of the disclosure, there is provided a multi-function apparatus. The multi-function apparatus includes the image information providing apparatus.

According to another aspect of the disclosure, there is provided an image information providing method. The image information providing method provides received image information to a registered user if a sender of the received image information matches a communication destination included in a list of communication destinations corresponding to the registered user.

According to another aspect of the disclosure, there is provided an image information providing program. The image information providing program causes a computer to function as the image information providing apparatus.

BRIEF DESCRIPTION OF THE DRAWINGS

FIG. 4 illustrates an example of an address book generated by and stored on the multi-function apparatus of the first embodiment of the disclosure;

FIG. 5 illustrates an example of facsimile reception data generated by and stored on the multi-function apparatus of the first embodiment of the disclosure;

FIG. 6 illustrates a list of facsimile reception data generated and displayed by the multi-function apparatus of the first embodiment of the disclosure;

DESCRIPTION OF THE EMBODIMENTS

Embodiments of the disclosure are described below with reference to the drawings.

First Embodiment

Figure 1:
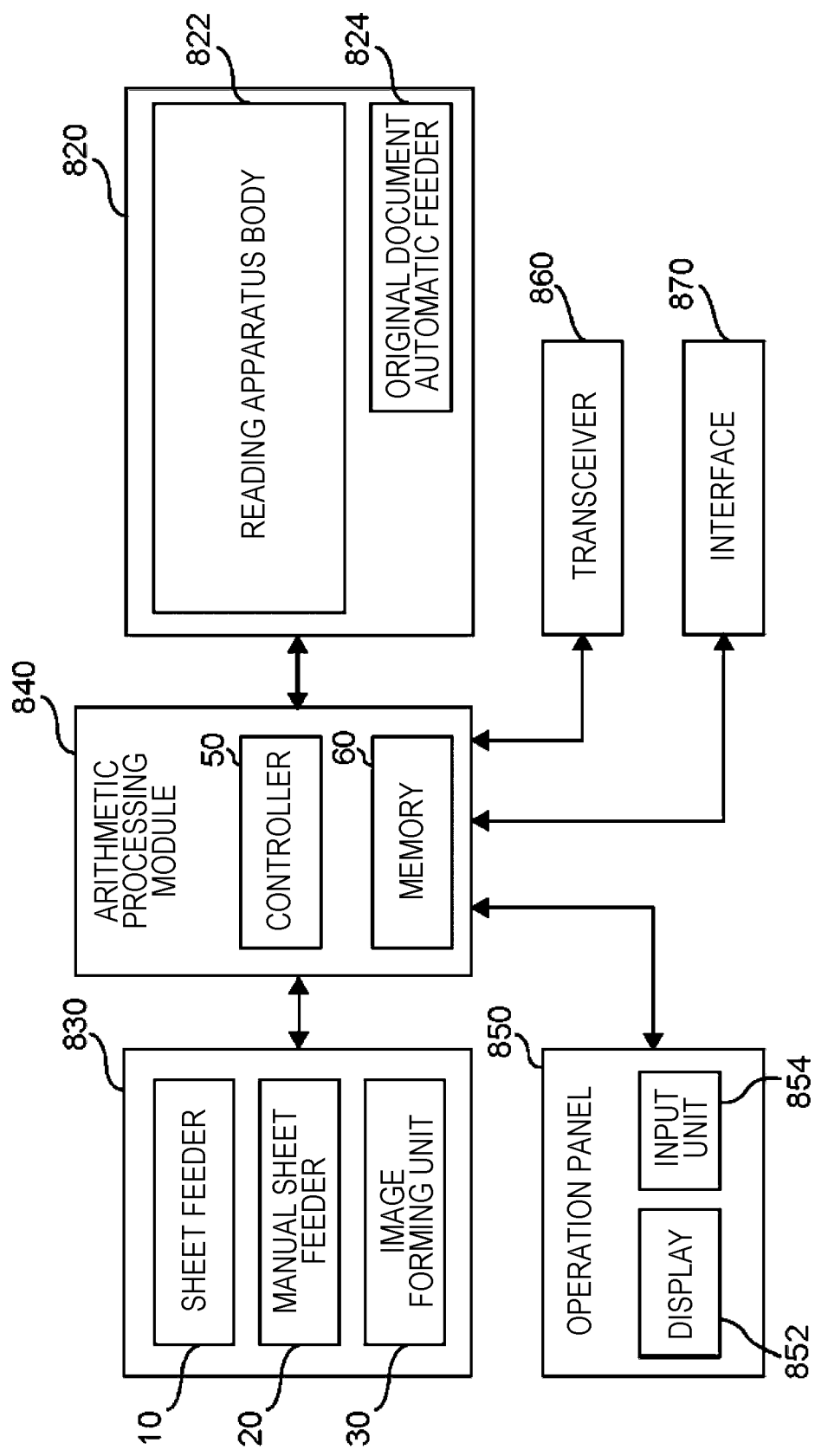
FIG. 1 is a functional block diagram of a multi-function of a first embodiment of the disclosure.
Figure 2:
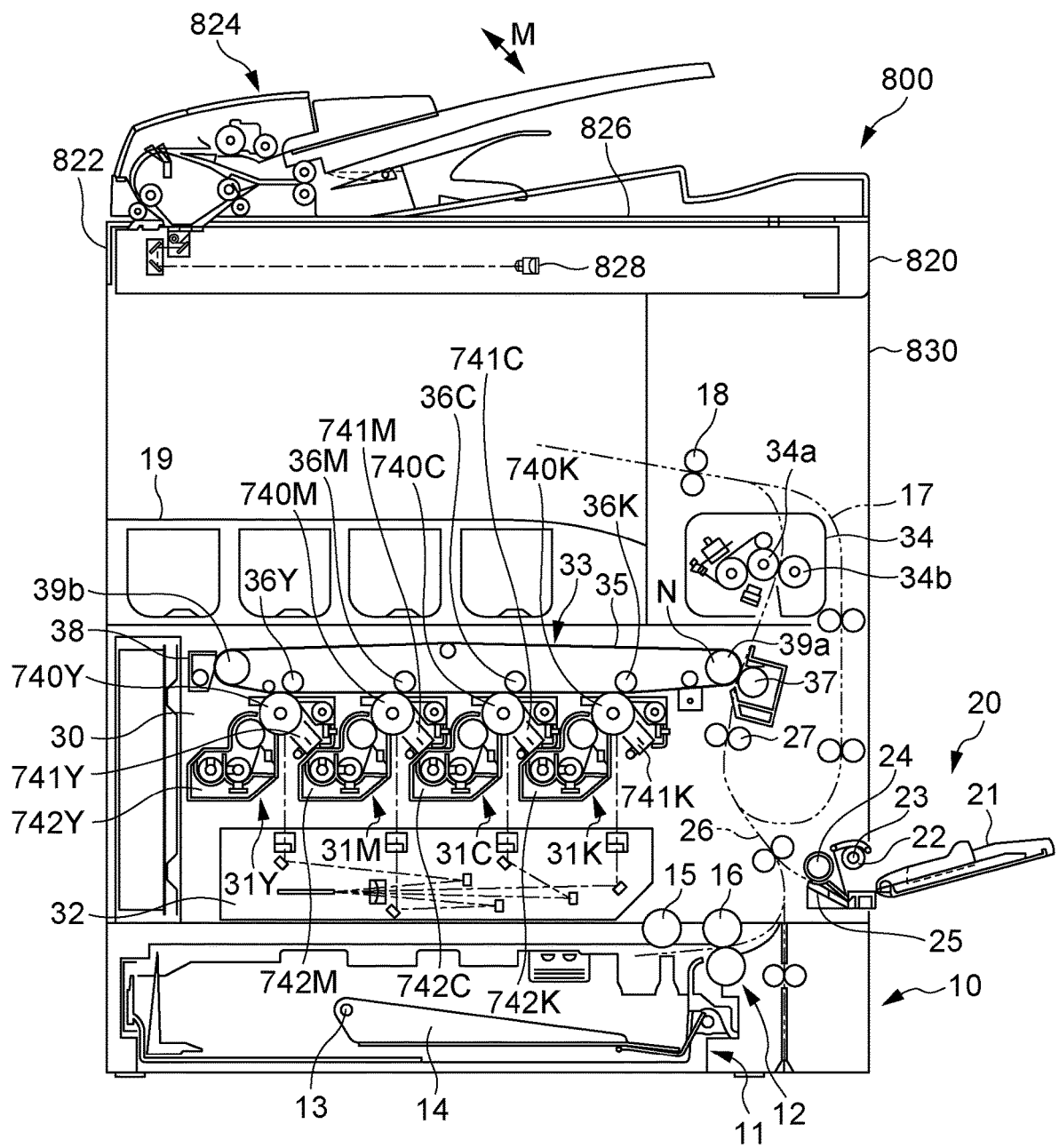
FIG. 2 is a sectional view of the multi-function apparatus of the first embodiment of the disclosure.

A first embodiment relates to a multi-function apparatus 800 including one of image information providing apparatuses of first through fourth embodiments. FIG. 1 and FIG. 2 illustrate the configuration of the multi-function apparatus 800.

Referring to FIG. 1 and FIG. 2, the multi-function apparatus 800 includes an original document reading apparatus 820, a multi-function apparatus body (image forming apparatus body) 830, an operation panel 850, an arithmetic processing module 840, a transceiver 860, and an interface 870. The original document reading apparatus 820 reads the image of an original document. The multi-function apparatus body 830 forms an image on a sheet. The operation panel 850 is used to operate the original document reading apparatus 820 and the multi-function apparatus body 830. The arithmetic processing module 840 controls the original document reading apparatus 820 and the multi-function apparatus body 830 in response to an operation performed on the operation panel 850. The transceiver 860 transmits and receives image information via a variety of public networks. The interface 870 performs wired or wireless connection with a computer.

The operation panel 850 is a touchpanel display including a display 852 and an input unit 854, and displays a variety of information and buttons responsive to modes of the multi-function apparatus 800.

The transceiver 860 transmits an image read by the original document reading apparatus 820 or an image stored on the memory or receives an image from the outside. The interface 870 is connected to a personal computer via a network. The computer connected to the multi-function apparatus 800 may use the functionality of the multi-function apparatus 800 to process the data managed by the computer. The original document reading apparatus 820 may be used alone to read an image. The multi-function apparatus body 830 may be used alone to form an image. These apparatuses may be interconnected to each other to copy an image.

The original document reading apparatus 820 includes an original document automatic feeder (single pass feeder) 824 that automatically transports an original document, and a reading apparatus body 822 that reads the image of an original document. The original document reading apparatus 820 includes, in addition to the elements of FIG. 2, the elements illustrated in FIG. 1 but not illustrated in FIG. 2. Referring to FIG. 1, the reading apparatus body 822 includes an original document platen 826.

The multi-function apparatus body 830 includes a sheet feeder 10 that feeds a sheet, a manual sheet feeder 20 that manually feeds a sheet, and an image forming unit 30 that forms an image on the sheet fed by the sheet feeder 10 or the manual sheet feeder 20.

The sheet feeder 10 includes a sheet tray 11 that holds a stack of sheets, and a pickup transporting unit 12 that picks up and transports, one by one, sheets stacked on the sheet tray 11. The sheet tray 11 includes an intermediate plate 14 that pivots about a rotary shaft 13. The intermediate plate 14 pivots upward about the rotary shaft 13 to raise a sheet to transport. The pickup transporting unit 12 includes a pickup roller 15 that transports the sheet raised by the intermediate plate 14 and a separation roller pair 16 that separates sheets one by one to be transported by the pickup roller 15.

The manual sheet feeder 20 includes a manual tray 21 on which sheets are manually stacked, and a pickup transporting unit 22 that picks up and transports sheets, one by one, stacked on the manual tray 21. The manual tray 21 is pivotally supported by the multi-function apparatus body 830. When the sheets are manually fed, the manual tray 21 is fixed at a specific angle to allow the sheets to be stacked. The pickup transporting unit 22 includes a pickup roller 23 that transports the sheets stacked on the manual tray 21, a separation roller 24 that separates the sheets, one by one, fed by the pickup roller 23, and a separation pad 25.

The image forming unit 30 includes four process cartridges 31Y through 31K that form images of yellow (Y), magenta (M), cyan (C), and black (K), photoconductor drums 740Y through 740K described below, an exposure device 32 that exposes the surfaces of the photoconductor drums 740Y through 740K to light, a transfer unit 33 that transfers toner images formed on the photoconductor drums 740Y through 740K to a sheet, and a fixing unit 34 that fixes the transferred toner images onto a sheet. Suffixes Y, M, C, and K respectively attached to reference numerals respectively represent yellow, magenta, cyan, and black.

Each of the four process cartridges 31Y through 31K is detachably mounted on the multi-function apparatus body 830, and may be replaced with a substitute. The four process cartridges 31Y through 31K are identical in configuration to each other except for the color of an image to be formed. Only the configuration of the process cartridge 31Y forming a yellow (Y) image is described, and the discussion of the other process cartridges 31M through 31K is omitted herein.

The process cartridge 31Y includes the photoconductor drum 740Y serving as an image carrier, a charger 741Y that charges the photoconductor drum 740Y, a development device 742Y that develops an image from an electrostatic latent image formed on the photoconductor drum 740Y, and a drum cleaner that removes toner remaining on the surface of the photoconductor drum 740Y. The development device 742Y includes a development device body (not illustrated in detail) that develops an image on the photoconductor drum 740Y, and a toner cartridge (not illustrated in detail) that supplies toner to the development device body. The toner cartridge is removably mounted on the development device body. The toner cartridge, if no toner remains therein, is removed from the development device body, and replaced with another one.

The exposure device 32 includes a light source (not illustrated) to emit a laser light beam, and multiple mirrors (not illustrated) that guide the laser light beam to the photoconductor drums 740Y through 740K. The transfer unit 33 includes an intermediate transfer belt 35, primary transfer rollers 36Y through 36K, a secondary transfer roller 37, and a belt cleaner 38. The intermediate transfer belt 35 carries toner images formed on the photoconductor drums 740Y through 740K. The primary transfer rollers 36Y through 36K primarily transfer the toner images formed on the photoconductor drums 740Y through 740K to the intermediate transfer belt 35. The secondary transfer roller 37 secondarily transfers the images transferred onto the intermediate transfer belt 35 to a sheet. The belt cleaner 38 removes toner remaining on the intermediate transfer belt 35. The intermediate transfer belt 35 is entrained about a driving roller 39a and a driven roller 39b, and the primary transfer rollers 36Y through 36K presses the intermediate transfer belt 35 against the photoconductor drums 740Y through 740K, respectively. The secondary transfer roller 37 has a nip N with the driving roller 39a, and the toner image carried by the intermediate transfer belt 35 at the nip N is transferred to the sheet. The fixing unit 34 includes a heating roller 34a that heats the sheet, and a pressure roller 34b that presses sheet against the heating roller 34a.

The operation panel 850 includes a display 852 that display specific information, and an input unit 854 that a user uses to input an instruction to the original document reading apparatus 820 and the multi-function apparatus body 830. In accordance with the first embodiment, the operation panel 850 is mounted on a front portion of the reading apparatus body 822. The front side of the reading apparatus body 822 corresponds to the front side of the plane of the page of FIG. 1, and the rear side of the reading apparatus body 822 corresponds to the rear side of the plane of the page of FIG. 1.

Referring to FIG. 1, the arithmetic processing module 840 includes a controller 50 that controls the sheet feeder 10, the manual sheet feeder 20, the image forming unit 30, and the original document reading apparatus 820, and a memory 60 that stores a variety of programs causing the controller 50 to operate, and a variety of information to be used by the controller 50. The memory 60 stores an image read by the original document reading apparatus 820, and an image received by the transceiver 860. In response to an operation performed on the operation panel 850 by the user, the arithmetic processing module 840 controls the sheet feeder 10, the manual sheet feeder 20, the image forming unit 30, and the original document reading apparatus 820 in coordinated operation, thereby forming an image on a sheet.

The image forming process of the multi-function apparatus 800 thus constructed (the image forming control performed by the arithmetic processing module 840) is described below. In the image forming process of the first embodiment, the image forming unit 30 forms the image of an original document, fed by the original document automatic feeder 824 and read by the reading apparatus body 822, on a sheet fed by the sheet feeder 10.

When an image forming start signal is output in response to an input entered on the input unit 854 of the operation panel 850 by the user, an original document placed on the original document automatic feeder 824 by the user is automatically fed to an original document reading position, and the image is read by the reading apparatus body 822 at the original document reading position.

When the image of the original document is read by the reading apparatus body 822, the exposure device 32 directs multiple laser light beams respectively to the photoconductor drums 740Y through 740K. The photoconductor drums 740Y through 740K are respectively pre-charged with the chargers 741Y through 741K. When the laser light beams are respectively directed to the photoconductor drums 740Y through 740K, electrostatic latent images are respectively formed on the photoconductor drums 740Y through 740K. The development devices 742Y through 742K respectively develop images from the electrostatic latent images on the photoconductor drums 740Y through 740K, thereby forming toner images of yellow (Y), magenta (M), cyan (C), and black (K) respectively on the photoconductor drums 740Y through 740K. The toner images formed on the photoconductor drums 740Y through 740K are transferred onto the intermediate transfer belt 35 in an overlaid fashion by the primary transfer rollers 36Y through 36K, and the transferred and overlaid toner image (a full-colored toner image) is carried on the intermediate transfer belt 35 and then transported to the nip N.

In parallel with the image forming process, the sheets stacked on the sheet tray 11 are picked up one by one by the pickup transporting unit 12 and then transported by the pickup roller 15 to a sheet transport path 26. A timing roller pair 27 upstream of the nip N corrects skewing and transports each sheet to the nip N at a specific transport timing. The secondary transfer roller 37 transfers the full-colored toner image carried by the intermediate transfer belt 35 to the sheet transported to the nip N.

The fixing unit 34 heats and presses the sheet having the toner image transferred thereon, thereby fixing the toner image to the sheet, and the sheet is then discharged out of the multi-function apparatus 800 by a discharge roller pair 18. The sheet discharged out of the multi-function apparatus 800 is stacked on a discharge sheet tray 19.

If images are to be formed on both sides of a sheet (first and second surfaces), the sheet having an image formed on the first surface is transported to a duplex printing transport path 17 by rotating the discharge roller pair 18 in a reverse direction before the sheet is discharged, and is then re-transported to the image forming unit 30. In the same way as with the first surface, an image is formed on the second surface of the sheet, and the sheet is then discharged. The sheet discharged out of the multi-function apparatus 800 is stacked on the discharge sheet tray 19.

Figure 3:
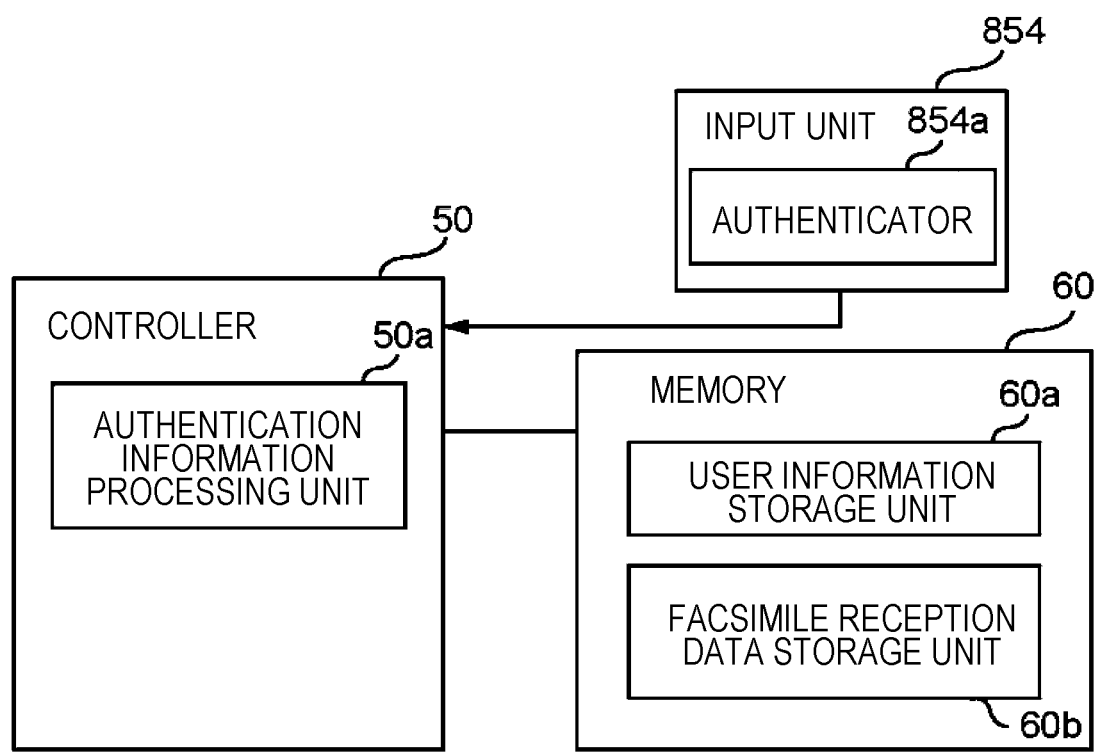
FIG. 3 is a functional block diagram related to authentication of the multi-function apparatus of the first embodiment of the disclosure.

FIG. 3 is a functional block diagram of a security system that provides image information to a user who has been authenticated. The security system includes an authenticator 854a that authenticates the user, an authentication information processing unit 50a, a user information storage unit 60a, and a facsimile reception data storage unit 60b. The user information storage unit 60a stores the user identification (ID) of each user, and an address book that is associated to each individual user.

FIG. 4 illustrates an example of the address book. Referring to FIG. 4, the address book of a user A having a user ID "A" stores the name of a partner of the user A, and a facsimile number of the address of the partner.

The facsimile reception data storage unit 60b stores received facsimile data, sender number notice service, and sender facsimile number data obtained in response to a transmitting subscriber identification (TSI) signal. TSI is terminal identification information registered on a facsimile machine, and may include any telephone number that is registered on a host apparatus.

FIG. 5 illustrates an example of facsimile reception data stored on the facsimile reception data storage unit 60b. Referring to FIG. 5, the facsimile reception data is stored in associated with "reception date" indicating time and date on which facsimile data has been received, a "facsimile number" of a sender, and received "facsimile data".

When the authenticator 854a has authenticated a user, the authentication information processing unit 50a compares the facsimile number data in the address book of the user with the sender facsimile data in the facsimile reception data. All the facsimile reception data having matched facsimile number data is displayed in a list on the display 852.

Figure 7:
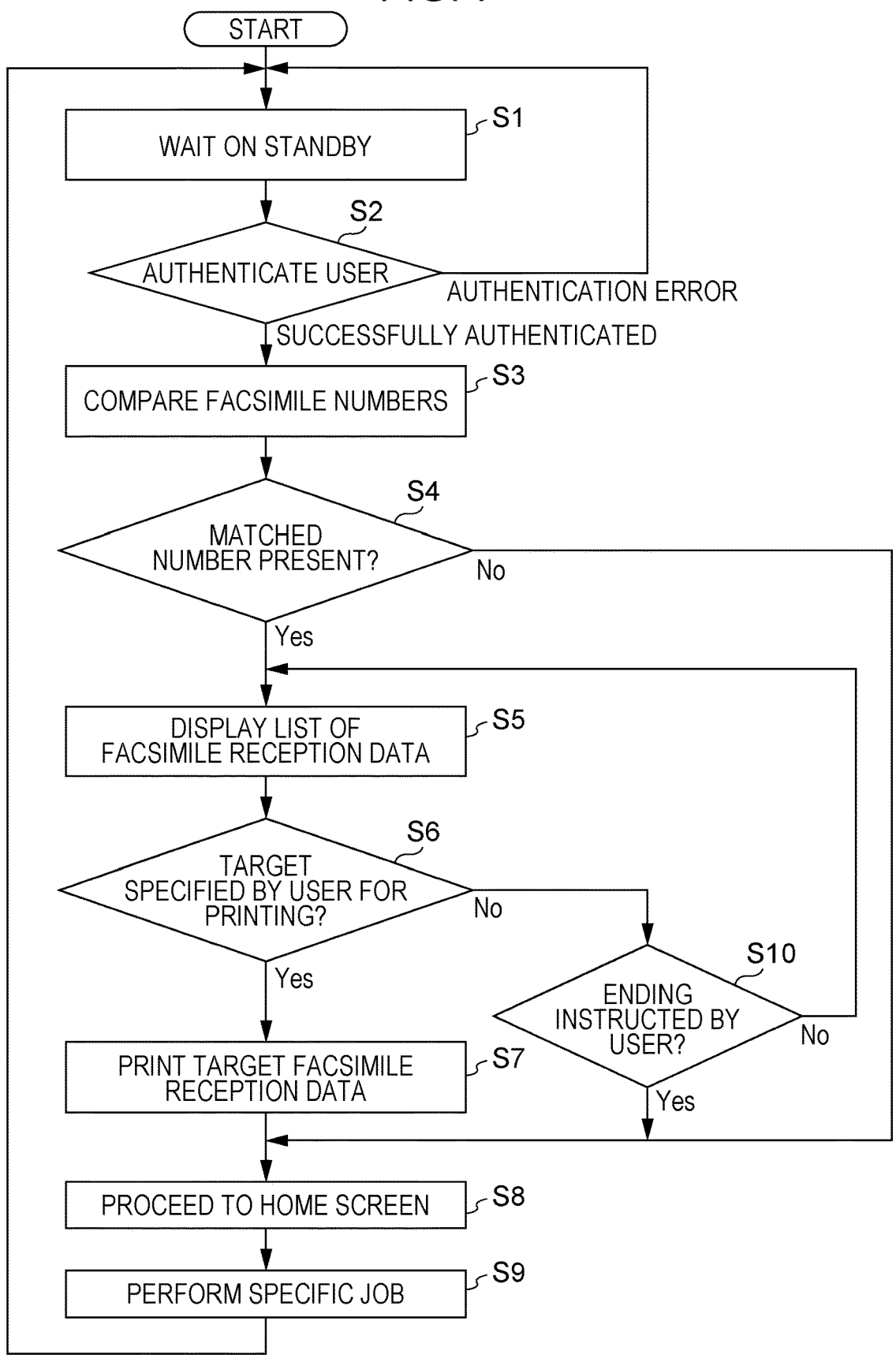
FIG. 7 is a flowchart illustrating an authentication process of the multi-function apparatus of the first embodiment of the disclosure.
Figure 8:
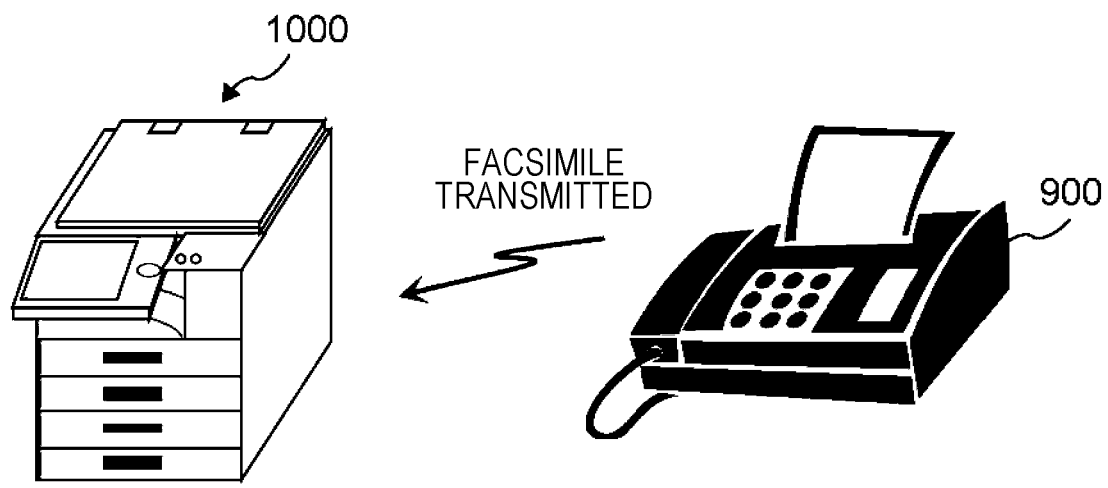
FIG. 8 illustrates the concept of facsimile transmission.
Figure 9:
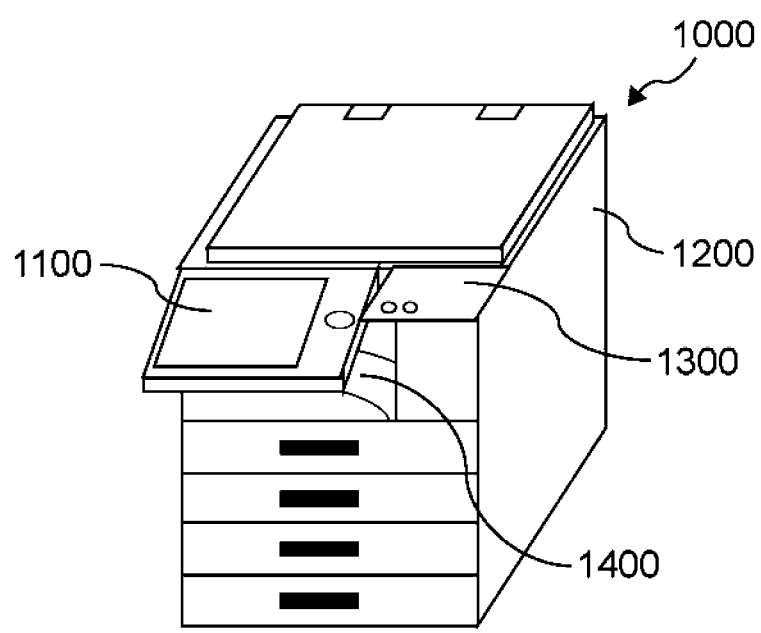
FIG. 9 is an external view of the multi-function apparatus.

FIG. 6 illustrates an example of the facsimile reception data list displayed on the display 852. The list indicates all the facsimile reception data including the sender facsimile number data in the facsimile reception data matching the facsimile number data in the address book of the user. FIG. 7 is a flowchart illustrating an image providing process.

The multi-function apparatus 800 waits on standby (step S1). The multi-function apparatus 800 displays a log-in message based on an authentication method. The message examples corresponding to authentication methods are listed below.

(1) Authentication with IC card

"Hold over your IC card"

(2) Fingerprint authentication

"Press on the fingerprint authentication location your registered finger"

(3) Authentication with user ID and password

"Enter your user ID and password"

In the following discussion, the method (1) is used.

When a power saving mode is set, the display 852 is off. When the user touches the input unit 854, the power saving mode is canceled, and the log-in message is displayed on the display 852.

When the user holds a user's authentication IC card over the input unit 854, the authenticator 854*a* reads the user ID, and determines whether the user ID matches one of the pre-registered user IDs (step S2). If the authenticator 854*a* determines that the input user ID matches one of the pre-registered user IDs, all the facsimile number data in the facsimile reception data in the address book of the user having the matched user ID stored on the user information storage unit 60*a* is compared with the facsimile number data of all the senders in the facsimile number data of all senders in the facsimile reception data stored on the facsimile reception data storage unit 60*b* (step S3). If there are no user IDs matching each other, the multi-function apparatus 800 waits on standby (step S1). If there is the facsimile reception data having the facsimile number data of a sender matching a facsimile number in the address book of the user, as a result of comparison (step S4), the controller 50 displays on the display 852 a list of all the facsimile reception data having the matched facsimile number data (step S5). If there is no matched facsimile number data, the controller 50 proceeds to a home screen (step S8). Before shifting to a standby state, the controller 50 may display a message, such as "no received messages". The controller 50 determines whether the user has specified a print target from the list displayed on the display 852 of the operation panel 850, and has instructed printing (step S6).

If the user has specified a print target and instructed printing, the controller 50 reads facsimile data as the specified target from the facsimile reception data storage unit 60*b*, and transfers the facsimile data to the multi-function apparatus body 830. The facsimile data is thus transferred to a sheet as an image by the multi-function apparatus body 830 and the sheet with the image having thereon is thus discharged (step S7).

A display example of FIG. 6 is described below. If the user touches check button 852*a* or 852*b* corresponding to the facsimile reception data to be printed, and touches a print button 852*c* for printing, the target received data is printed.

The controller 50 determines whether the user has instructed the printing to be ended (step S10). If the user has instructed the printing to be ended, the controller 50 displays the home screen on the display 852 (step S8). With reference to the display example of FIG. 6, if the user instructs the ending to be performed by touching an end button 852*d* on the operation panel 850, the controller 50 displays the home screen on the display 852.

The home screen is designed to appear first at the startup of the multi-function apparatus 800, and is used to select one of jobs including facsimile transmission, facsimile reception, copying, printing, and scanning. The controller 50 performs a job selected on the home screen by the user (step S9), and then waits on standby (step S1).

The process described above outputs, to the user who has been successfully authenticated, only the facsimile data of the facsimile reception data including sender facsimile number data matching the facsimile number data of a communication destination included in the address book of the user. The facsimile data is thus output in view of security. Through the process, the facsimile data is efficiently output in view of security, even if the sender and the destination are not identical in apparatus or format. If the facsimile data is output through only this process, security is reliably ensured.

If the user has been authenticated, the facsimile reception data satisfying the condition is printed (through steps S3 through S7) prior to the displaying of the home screen (step S8). This arrangement controls the inconvenience that the facsimile reception data addressed to the user is left unprinted.

Second Embodiment

An image forming method of a second embodiment of the disclosure is described below. The second embodiment supports the following cases.

(1) Case in which the sender inputs "184" prior to the facsimile number of the sender (2) Case in which an inappropriate value, such as a blank facsimile number or an abnormal value, is set to TSI information (3) Case in which facsimile data is received from a sender that has not been registered in the address book of all users In these cases, the received facsimile data remains in the multi-function apparatus 800 without being output. To definitely output the received facsimile data, an email is transferred to all users and/or the administrator.

More specifically, when facsimile data is received, the controller 50 determines whether the facsimile number data of the sender is present. If there is facsimile number data, the controller 50 determines whether the facsimile data is correct. If there is no facsimile number data of the sender, or the facsimile data is not correct, the controller 50 reads an email address of the administrator and a message to the administrator stored on the memory 60, and the controller 50 transmits the email to the administrator via the interface 870.

By reading the email, the administrator recognizes the reception of the facsimile data that remains in the multi-function apparatus 800 without being output. The administrator then performs an authentication operation, and outputs the facsimile data that has been left.

Third Embodiment

An image providing method of a third embodiment of the disclosure is described below.

The third embodiment addresses the problems associated with the three cases (1), (2), and (3) described with reference to the second embodiment. In accordance with the third embodiment, a list of the facsimile data that is left in the multi-function apparatus 800 is displayed to the administrator after being authenticated such that no facsimile data is left in the multi-function apparatus 800.

More specifically, when the facsimile data is received, the controller 50 determines whether there is facsimile number data of a sender. If there is facsimile number data, the controller 50 determines whether the facsimile data is correct. If there is no facsimile number data of the sender, or the facsimile data is not correct, the controller 50 attaches to the facsimile data an unoutput flag.

The list of the facsimile reception data is displayed to the authenticated user, and the facsimile reception data with the unoutput flag attached thereto is read from the facsimile reception data storage unit 60*b* and displayed in a list on the display 852 to the authenticated user.

Information concerning the facsimile reception data with the unoutput attached thereto may be notified in email to all or some users periodically or for a specific period of time. The information concerning the facsimile reception data to be notified may be reception time and date and a sender facsimile number, or image that is produced in accordance with the facsimile reception data. The user thus recognizes the presence of the facsimile reception data left in the multi-function apparatus 800, and may take action accordingly. The user thus recognizes the presence of the unoutput facsimile reception data that is left in the multi-function apparatus, and performs accordingly.

Fourth Embodiment

An image providing method of a fourth embodiment of the disclosure is described below.

The fourth embodiment of the disclosure provides a coping method for the three cases (1) through (3) described with reference to the third embodiment. In accordance with the fourth embodiment, the administrator after being authenticated causes a list of the facsimile reception data left in the multi-function apparatus to be displayed such that no facsimile reception data remains intact.

More specifically, if when facsimile data is received, the controller 50 determines whether the facsimile reception data of the sender is present. If the facsimile reception data is present, the controller 50 determines whether the facsimile reception data is correct. If there is no facsimile reception data of the sender or the facsimile reception data is not correct, the controller 50 attaches an unoutput flag indicating that there is no facsimile reception data or that the facsimile reception data is not correct.

The controller 50 reads from the facsimile reception data storage unit 60*b* the facsimile reception data with the unoutput flag attached thereto, and displays a list of the facsimile reception data on the display 852 to the authenticated administrator.

Information concerning the facsimile reception data with the unoutput attached thereto may be notified in email to all or some users periodically or for a specific period of time. The information concerning the facsimile reception data to be notified may be only reception time and date and a sender facsimile number, or image that is produced in accordance with the facsimile reception data. The administrator thus recognizes the presence of the facsimile reception data left in the multi-function apparatus, and may take action accordingly. The second through fourth embodiments thus reliably control the unoutput facsimile reception data that is left in the multi-function apparatus.

Fifth Embodiment

The first embodiment is based on the premise that the sender of the facsimile reception data matches the communication destination included in the phone book for one person only. The sender of the facsimile reception data may match the communication destination included in phone books for two or more persons.

In such a case, it may be insufficient if only a first person outputs the facsimile reception data. If the sender of the facsimile reception data matches the communication destination included in phone books for two or more persons, the method of the first embodiment may be used for all persons.

If a facsimile is received, the sender of the facsimile is compared with each of the communication destinations included in the phone books of all registered users. If the method of the first embodiment is applicable to all the matched users, the facsimile reception data is deleted from the facsimile reception data storage unit 60*b*. For this reason, a counter may be included that decrements a count thereof each time an initialization operation is performed in response to the number of matches, or a method of managing the matched user with the user ID may be used.

Sixth Embodiment

Printing is performed in step S7 of the flowchart of FIG. 7. Alternatively, image information data may be transmitted through data communication to a computer of a user who has been authenticated. A data list of the facsimile reception data may be transmitted to a computer of a user who has been authenticated. In such a case, the user has been authenticated on the multi-function apparatus (step S2), but the user may be remotely located from the computer, and the user may be authenticated again on the computer. The authentication using the computer may be performed using one of the three methods described above.

The facsimile reception data recognized on the computer by the user may be verified on the screen of the computer. If the user has determined that the facsimile reception data is not secret, the computer may instruct the multi-function apparatus to print without any waiting time. If the user has determined that the facsimile reception data is to be kept secret, the computer may instruct the multi-function apparatus to print when the user logs in on the multi-function apparatus.

Seventh Embodiment

The cooperation between the multi-function apparatus and the computer in accordance with the sixth embodiment is based on the premise that the multi-function apparatus transmits the facsimile reception data to the computer in step S7 of FIG. 7. If the facsimile reception data is viewed on the screen of the computer, the user is free from going to the multi-function apparatus. In accordance with the seventh embodiment, the multi-function apparatus manages the phone book of the registered users, but the user is authenticated by the computer instead of the multi-function apparatus.

When the multi-function apparatus receives a facsimile document, the reception of the facsimile is notified to the computer of the user if the facsimile number of the sender is registered in the phone book of any user. This notification may be performed by email or by a message in groupware, or by another other method.

The facsimile reception data may be attached to the notification, or a link is pasted to the facsimile reception data. In this case, the facsimile reception data may be protected with a password unique to the user. If the link is pasted, an authentication device may be arranged to access to a link destination.

If a user is an employee of a company, a sender may transmit a facsimile message to the company. If the sender is registered in a phone book of employees, that employee may recognize a notification of the facsimile reception and the facsimile reception data at his or her own seat.

Eighth Embodiment

In accordance with the first embodiment, the received image information is stored, and the controller outputs only the facsimile data of the facsimile reception data including sender facsimile number data matching the facsimile number data serving the communication destination included in the address book of the user who has been successfully authenticated. The controller determines at the reception whether the sender facsimile number data is included in the address book of all users. If the controller determines that the sender facsimile number data is not included in the address book of all users, the controller inhibits the storage of the facsimile data of the facsimile reception data.

The image information providing apparatus may be implemented with a combination of hardware and software. The image information providing method performed by the image information providing apparatus may also be implemented by a combination of hardware and software. The implementation by software means that a computer implements the image information providing method by reading and executing a program.

The program may be stored on a variety of non-transitory computer readable media, and then installed on the computer. The non-transitory computer readable media include a variety of types of tangible storage media. Example of non-transitory computer-readable recording media include magnetic recording media (including a flexible disk, a magnetic tape, and a hard disk drive), magneto-optical recording media (such as a magneto-optical disk), a compact-disk read-only (CD-ROM), CD-R, CD-R/W), semiconductor memory (mask ROM, programmable ROM (PROM), EPROM (erasable ROM)), flash ROM, and a random-access memory (RAM). The program may be supplied to the computer using a variety of types of transitory computer readable medium. The transitory computer readable media include an electrical signal, an optical signal, and an electromagnetic wave. The transitory computer readable recording medium provides the program to the computer using a wired communication network, such as a wire, or an optical fiber, or a radio communication network.

The disclosure finds applications to protect security of a received image.

The present disclosure contains subject matter related to that disclosed in Japanese Priority Patent Application JP 2017-029224 filed in the Japan Patent Office on Feb. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A multi-function apparatus comprising:
   a receiver that receives facsimile data from originating numbers;
   a memory that stores the facsimile data and originating numbers received by the receiver such that the facsimile data are associated with the respective originating numbers thereof;
   a controller that, when a user logs into the multi-function apparatus, compares each of the originating numbers stored in the memory with each of destination numbers in a communication destination list that corresponds to the user from among a plurality of communication destination lists that respectively correspond to a plurality of users;
   a display that displays, exclusively to the user, a reception list of only the facsimile data associated with the originating numbers that correspond to the destination numbers in the communication destination list of the user; and
   a printer that prints the facsimile data included in the reception list displayed on the display; wherein
   when an administrator logs into the multi-function apparatus, the display displays the facsimile data received from the originating numbers which do not correspond to any of the plurality of communication destination lists respectively corresponding to the plurality of users.

2. The multi-function apparatus according to claim 1, wherein the memory stores at least the facsimile data and the originating numbers received from the originating numbers corresponding to the destination numbers in the communication destination list of any of the plurality of the users.

3. The multi-function apparatus according to claim 1, wherein the originating numbers correspond to facsimile numbers, and the display displays the facsimile data received from the originating numbers which do not correspond to any of the plurality of communication destination lists respectively corresponding to the plurality of users.

4. The multi-function apparatus according to claim 1, wherein the display displays the facsimile data associated with the originating numbers that correspond to the destination numbers in the communication destination list of the user, and sends the facsimile data selected from the displayed reception list to a computer of the user who has logged in.

5. The multi-function apparatus according to claim 4, wherein the printer prints the facsimile data from among the facsimile data sent to the computer of the user in response to an instruction from the computer.

6. The multi-function apparatus according to claim 4, wherein the printer prints the facsimile data among the facsimile data sent to the computer of the user, in response to an instruction from the computer after the instruction or when the user logs into the multi-function apparatus thereafter, in accordance with a selection of the instruction.

7. The multi-function apparatus according to claim 1, further comprising:
   a notifier that, if the receiver receives the facsimile data from one of the originating numbers that corresponds to the destination number in any of the plurality of communication destination lists, notifies the user of the reception of the facsimile data with or without the facsimile data.

8. The multi-function apparatus according to claim 1, wherein the display, before the multi-function apparatus displays a home screen, displays the reception list of the facsimile data associated with the originating numbers which correspond to the destination numbers in the communication destination list of the user.

9. A multi-function apparatus comprising:
   a receiver that receives facsimile data from originating numbers;

a memory that stores the facsimile data and originating numbers received by the receiver such that the facsimile data are associated with the respective originating numbers thereof;

a controller that, when a user logs into the multi-function apparatus, compares each of the originating numbers stored in the memory with each of destination numbers in a communication destination list that corresponds to the user from among a plurality of communication destination lists that respectively correspond to a plurality of users;

a display that displays, exclusively to the user, a reception list of only the facsimile data associated with the originating numbers that correspond to the destination numbers in the communication destination list of the user;

a printer that prints the facsimile data included in the reception list displayed on the display; and a notifier that, if the receiver receives the facsimile data from the originating number that does not correspond to any of the plurality of communication destination lists respectively corresponding to the plurality of users, notifies an administrator of the facsimile data.

10. The multi-function apparatus according to claim 9, wherein the memory stores at least the facsimile data and the originating numbers received from the originating numbers corresponding to the destination numbers in the communication destination list of any of the plurality of the users.

11. The multi-function apparatus according to claim 9, wherein the originating numbers correspond to facsimile numbers, and the display displays the facsimile data received from the originating numbers which do not correspond to any of the plurality of communication destination lists respectively corresponding to the plurality of users.

12. The multi-function apparatus according to claim 9, wherein the display displays the facsimile data associated with the originating numbers that correspond to the destination numbers in the communication destination list of the user, and sends the facsimile data selected from the displayed reception list to a computer of the user who has logged in.

13. The multi-function apparatus according to claim 12, wherein the printer prints the facsimile data from among the facsimile data sent to the computer of the user in response to an instruction from the computer.

14. The multi-function apparatus according to claim 12, wherein the printer prints the facsimile data among the facsimile data sent to the computer of the user, in response to an instruction from the computer after the instruction or when the user logs into the multi-function apparatus thereafter, in accordance with a selection of the instruction.

15. The multi-function apparatus according to claim 9, further comprising:
a notifier that, if the receiver receives the facsimile data from one of the originating numbers that corresponds to the destination number in any of the plurality of communication destination lists, notifies the user of the reception of the facsimile data with or without the facsimile data.

16. The multi-function apparatus according to claim 9, wherein the display, before the multi-function apparatus displays a home screen, displays the reception list of the facsimile data associated with the originating numbers which correspond to the destination numbers in the communication destination list of the user.

* * * * *